Sept. 1, 1953
W. BINGAMAN
2,650,563
ROLL OILING APPARATUS FOR USE WITH
ROLL-MAKING MACHINES
Filed July 22, 1950
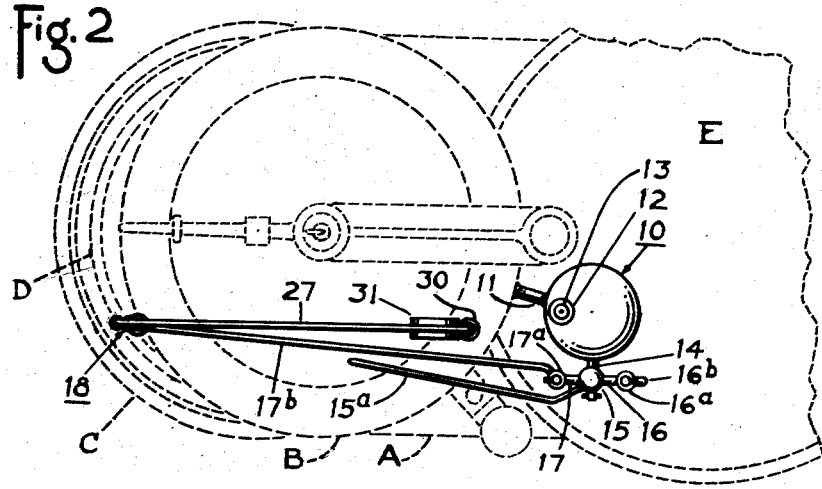
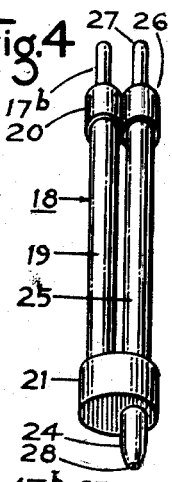
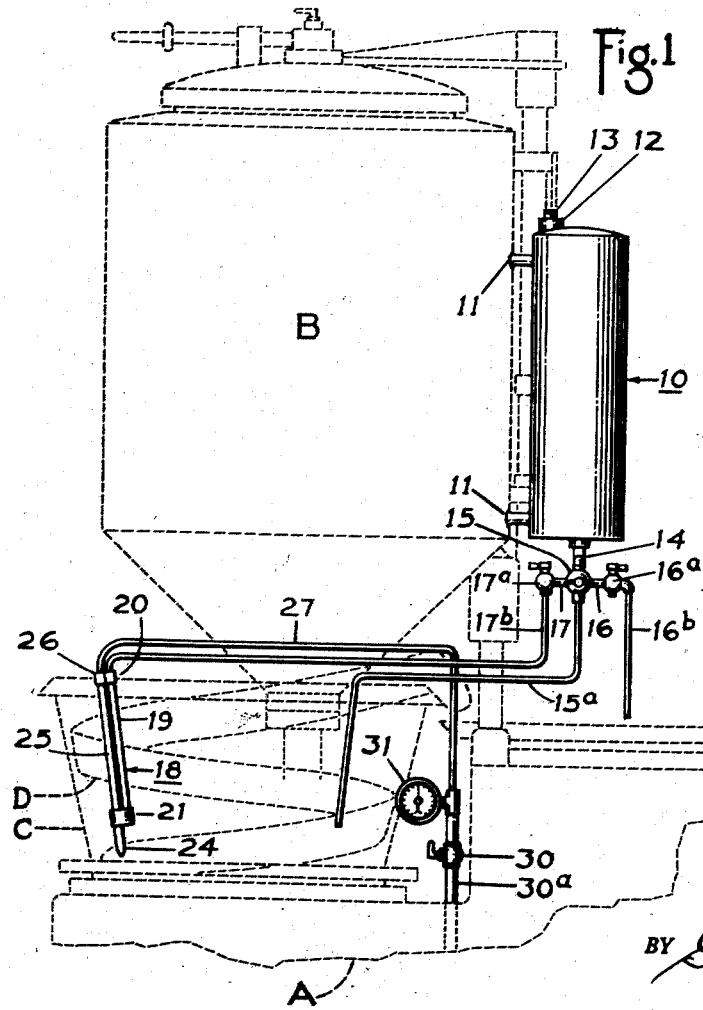
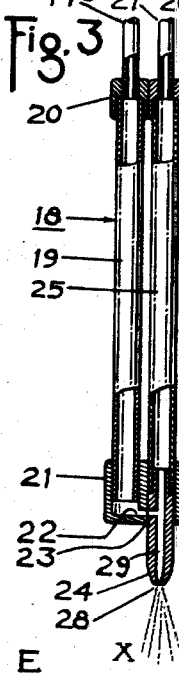
WALTER BINGAMAN
INVENTOR.
BY *G. Lorenze Miller*
ATTORNEY Patented Sept. 1, 1953

2,650,563

UNITED STATES PATENT OFFICE 2,650,563

ROLL OILING APPARATUS FOR USE WITH ROLL-MAKING MACHINES

Walter Bingaman, Champaign, Ill.

Application July 22, 1950, Serial No. 175,445

1 Claim. (Cl. 118—24)

My present invention relates to apparatus for use in connection with roll-making machines of the general type used in bakeries and has for its main object the spraying of dividing oil on the scaled dough pieces passing through the machine, thereby rendering the machine free from sticky or hardened dough particles which otherwise adhere to various parts of the machine both while in operation and idle.

Another object is the provision of a gravity feed oil dispensing reservoir adapted for suitable mounting on the machine, the reservoir being provided with an auxiliary gravity oil feed conduit, an emergency gravity oil feed conduit, and a main gravity oil feed conduit which has assembled in connection therewith, an air feed conduit having a spray head member and adapted for assembly with an air compressor unit housed in the base of the machine.

A further object is the provision of regulating valves for each of the oil feed conduits and for the air feed conduit to insure the required quantitative flow of oil and air for the machine in use.

Other objects and advantages will appear from the following description and reference to the accompanying drawings, in which:

Figure 1 is a side elevation of my present invention shown in full line and mounted on a roll-making machine which, not being a part of my invention, is shown in dotted lines, and the lower portion thereof is broken away to conserve space.

Figure 2 is a top plan view of Fig. 1, a portion at the right-hand end thereof being broken away to conserve space.

Figure 3 is an enlarged detail view, the top and bottom ends being in section, showing the oil spray assembly.

Figure 4 is a perspective view taken from beneath the assembly shown in Fig. 3, showing more clearly the general shape and contour of the same.

Referring now to the drawings and having first reference to Fig. 1, the dotted lines indicate generally the roll-making machine, the base housing being indicated by the letter A, the dough tank by the letter B, the revolving rounder bowl by the letter C, the stationary spiral member by the letter D, and the revolving turn-table by the letter E, and it is obvious that a showing of the various parts of the machine is omitted, save in the case of such parts as have a direct connection or association with my invention.

In the Figs. 1 and 2 it will be noted that the oil reservoir bears the numeral 10 and it is shown vertically mounted on the side of the dough tank B by means of the horizontal bracket members 11. On the top of the oil reservoir 10 is provided the oil filling port 12 having a removable vented cap 13.

Depending centrally from the bottom of the oil reservoir is the relatively short gravity feed oil pipe 14 having its lower end formed so as to project outwardly from the reservoir 10 and connect with the regulating valve 15 from which depends the emergency oil feed conduit 15ª arranged to provide oil on the stationary spiral member D in case the main oil feed conduit 18ª becomes momentarily clogged.

Mounted on the opposite sides of the regulating valve 15 are two relatively short oil feed conduits 16 and 17 having mounted on their outer ends the regulating valves 16ª and 17ª respectively which in turn have depending therefrom the auxiliary oil feed conduit 16ᵇ and the main oil feed conduit 17ᵇ respectively. The conduit 16ᵇ directs oil to the surface of the turn-table E, and the conduit 17ᵇ directs oil to the tube member 19 of the spray unit assembly 18, said tube member 19 being connected to the upper end of the conduit 17ᵇ by means of the cap member 20.

It will be noted, particularly in the Fig. 3, that said oil tube member 19 connects at its lower end to the nozzle fitting 21 in which the horizontally disposed orifice 22 registers in line with and forms a conduit connection with a similarly arranged orifice 23 in one side of and intermediate the top and bottom of the nozzle member 24 protruding downwardly from said nozzle fitting 21 and in connection with the air tube member 25 which is connected to the compressed air feed conduit 27 by the cap member 26.

The structure and arrangement of the spray unit assembly 18, with particular reference to its assembled relation to and connection with the spray nozzle 24 discloses the unit character thereof, and the spraying of oil therewith is accomplished by means of compressed air (from a compression tank not shown but mounted within the housing A of the roll-making machine), being forced from the relatively small orifice 28 centrally in the outer end of said nozzle 24, and the subsequent suction which draws a certain amount of oil through the aligned orifices 22 and 23 into the air stream through the bore 29 and out of the orifice 28 of the nozzle 24 in the form of oil spray indicated at X, which directs a very thin coating of dividing-oil on the dough pieces as they are propelled along the course of the stationary spiral member D by the revolving rounder bowl, and upwardly out and onto the turn-table E for panning.

An air regulating valve 30 is provided from the air line 30a from the air compressor within the housing A of the machine, and an air pressure indicator 31 is provided in the same line adjacent the valve 30, thereby enabling the operator to determine and regulate the amount of air flow which in turn diminishes or increases the density of the oil spray from the spray unit 18 at the will of the operator.

It is obvious too, that by means of the regulating valves 15, 16a and 17a the amount of oil flow from the oil feed conduits 15a, 16b and 17b may be fixed at the will of the operator in accordance with the requirements of the machine with respect to various types and sizes of scaled dough pieces being handled therethrough.

It is here pointed out that inasmuch as the air feed conduit and oil feed conduits of my invention are of such metal as facilitates the ready forming and shaping thereof to meet the physical requirements of various types of roll-making machines, the same is in no way limited to the type of machine indicated generally by the dotted lines in the accompanying drawing. And it is also pointed out that any suitable means may be adopted for mounting the spray unit 18 on the various types of machines, although simple and well known clamping devices have been conveniently and successfully used for the purpose.

The roll-making machine forming no part of my invention, it is thought that further descriptive details referring to the structure and operation of said machine are unnecessary to a clear understanding of my improved apparatus for the purpose herein set forth.

While I have illustrated and described one particular embodiment of my invention, it will be apparent to those skilled in the art that the principle thereof may be utilized in other embodiments. I do not, therefore, present my invention as being limited to the herein disclosed embodiment.

Reference to the appended claims will determine the scope of the present invention.

What is claimed is:

An apparatus of the character herein described comprising in combination a gravity feed reservoir for containing dividing oil, a plurality of regulator valves connected by a conduit to the reservoir and adapted as determinants to provide sustained flow of oil in connection with a roll-making machine, a conduit member connected to one of said regulator valves to direct the dividing oil to a point within a part of the machine, a conduit member connected to another of said regulator valves to direct said oil to a point on a part outside of the machine, and a conduit member connected to still another of said regulator valves to direct said oil to an oil spraying element adapted to spray dividing oil at a point within a part of the machine, a conduit member adapted to convey air under compression to said oil spraying element, a regulator valve and an air pressure indicator connected with said air conveying conduit member, a spray nozzle member in said oil spraying element, a bore opening longitudinally through the spray nozzle and a side opening in the nozzle, said side opening in aligned communication with a corresponding opening interiorly of the oil spraying element to effect the spraying of a regulated quantity of oil from the spray nozzle member by means of compressed air for the purpose of directing a spray of dividing oil on dough pieces carried by the mechanism of said machine past the spray nozzle of said oil spraying element.

WALTER BINGAMAN.

References Cited in the file of this patent

UNITED STATES PATENTS

| Number | Name | Date |
|---|---|---|
| 577,496 | Wallwork et al. | Feb. 23, 1897 |
| 1,139,181 | Heilig | May 11, 1915 |
| 1,305,127 | Lawson | May 27, 1919 |
| 1,917,767 | Larson | July 11, 1933 |
| 2,106,187 | Naugler | Jan. 25, 1938 |